(12) United States Patent
Volk et al.

(10) Patent No.: US 10,384,489 B2
(45) Date of Patent: Aug. 20, 2019

(54) PNEUMATIC VEHICLE TIRE

(71) Applicant: Continental Reifen Deutschland GmbH, Hannover (DE)

(72) Inventors: Heiner Volk, Neustadt (DE); Reinhard Ludwig, Bad Muender (DE); Christian Weber, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 1283 days.

(21) Appl. No.: 14/020,438

(22) Filed: Sep. 6, 2013

(65) Prior Publication Data
US 2014/0000773 A1 Jan. 2, 2014

Related U.S. Application Data

(63) Continuation of application No. PCT/EP2012/052744, filed on Feb. 17, 2012.

(30) Foreign Application Priority Data

Mar. 7, 2011 (DE) .................... 10 2011 001 133

(51) Int. Cl.
*B60C 1/00* (2006.01)
*B60C 11/00* (2006.01)
(52) U.S. Cl.
CPC ........ *B60C 11/0075* (2013.01); *B60C 1/0016* (2013.01); *B60C 2011/0025* (2013.01)
(58) Field of Classification Search
CPC ... B60C 1/0016; B60C 11/00; B60C 11/0008; B60C 11/0041; B60C 11/0075; B60C 2011/0016; B60C 2011/0025
See application file for complete search history.

(56) References Cited

U.S. PATENT DOCUMENTS 3,406,733 A * 10/1968 Boileau ......................... 152/542
4,044,811 A * 8/1977 Dudek et al. .................. 152/452

FOREIGN PATENT DOCUMENTS

| DE | 198 50 766 A1 | 5/2000 |
| DE | 10 2005 045 000 A1 | 3/2007 |
| DE | 10 2006 012 536 A1 | 9/2007 |

(Continued)

OTHER PUBLICATIONS

International Search Report dated Apr. 26, 2012 of international application PCT/EP2012/052744 on which this application is based.

(Continued)

*Primary Examiner* — Justin R Fischer
(74) *Attorney, Agent, or Firm* — Walter Ottesen, P.A.

(57) ABSTRACT

A pneumatic vehicle tire having a radial carcass, an at least single-layer belt and a tread that is composed of two layers, a tread cap and a tread base, which are made from different rubber mixtures, in a radial direction, the tread base having a central portion and two lateral portions that extend at least in a radially outward direction from an axial perspective. The two lateral portions are made from a rubber mixture that has a lower dynamic modulus of elasticity E' at 55° C. in accordance with DIN 53513 (measured at an extension of 8%) and a lower hysteresis than the central portion of the tread base for a lower rolling resistance without worsening the handling behavior of the vehicle tire.

12 Claims, 1 Drawing Sheet

(56) References Cited

FOREIGN PATENT DOCUMENTS

EP 1016555 * 7/2000
JP 2005-263175 A 9/2005
JP 2009-286317 A 12/2009

OTHER PUBLICATIONS

Schnetger, J., "Lexikon der Kautschuk-Technik", 1991, Huethig Buch Verlag GmbH, Heidelberg, Germany, pp. 42 to 49.

* cited by examiner

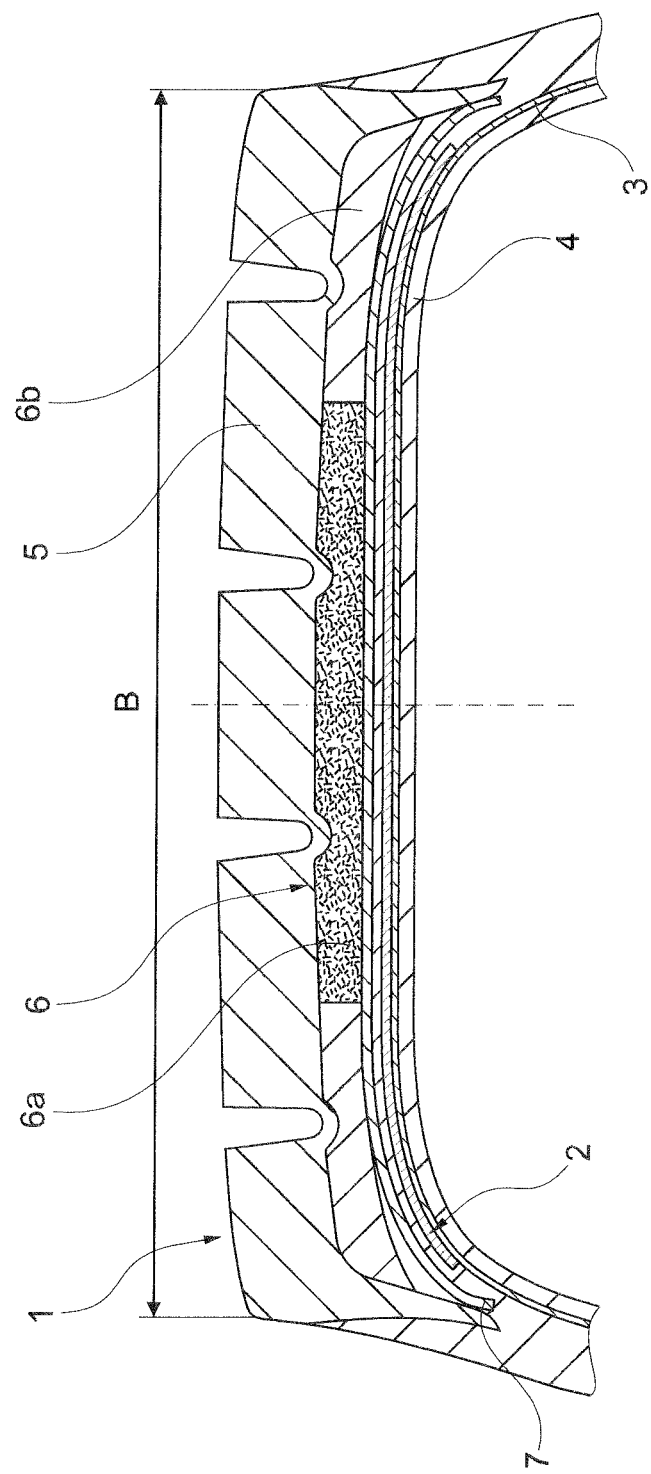

PNEUMATIC VEHICLE TIRE

CROSS REFERENCE TO RELATED APPLICATIONS

This application is a continuation application of international patent application PCT/EP2012/052744, filed Feb. 17, 2012, designating the United States and claiming priority from German application 10 2011 001 133.1, filed Mar. 7, 2011, and the entire content of both applications is incorporated herein by reference.

FIELD OF THE INVENTION

The invention relates to a pneumatic vehicle tire, especially for commercial vehicles, with a radial ply carcass, a multilayer belt and a tread that is comprised in the radial direction of two layers comprising different rubber compounds, a tread cap and a tread base, in which, viewed in the axial direction, the tread base has, at least directed radially outwardly, a central segment and two lateral segments.

BACKGROUND OF THE INVENTION

It is usual to provide pneumatic vehicle tires, both for automobiles and for commercial vehicles, with a two-part tread, which includes a tread cap, which comes into contact with the road surface during rolling of the tire, and a tread base. The tread cap is made from a rubber compound optimized with respect to abrasion and the tread base is made from a rubber compound optimized with respect to hysteresis. In addition to the rolling resistance of a tire, the tread base also affects its handling (road handling), with optimization of one property being at the expense of the other property.

Pneumatic vehicle tires of the type stated at the beginning, with additional division of the tread base into different zones over the axial width, are known from the prior art. The division of the base is used for adapting the properties of the tire even better to the required conditions.

For example, DE 10 2006 012 536 A1 describes a pneumatic vehicle tire, especially a commercial vehicle tire, which for improved belt durability and for reduced rolling resistance has a divided tread base, which is formed in its lateral segments from a compound with a higher thermal conductivity. The thermal conductivity of this compound is higher than that of the tread cap and that of the central segment of the tread base. Improvement of the rolling resistance of a pneumatic vehicle tire by configuring the tread base to be softer in the middle and harder in the lateral zones, with the outer segments being formed with higher hysteresis, that is, with smaller rebound elasticity, is known from DE 198 50 766 A1. However, with pneumatic vehicle tires with such a structure of the tread base it has been found that tire handling is impaired.

SUMMARY OF THE INVENTION

The problem to be solved by the invention is therefore to lower the rolling resistance for a tire of the type stated at the beginning and at the same time not have a negative influence on handling.

This problem is solved according to the invention in that the two lateral segments comprise a rubber compound that has a lower dynamic elastic modulus E' at 55° C. according to DIN 53513 (measured at 8% extension) and a lower hysteresis than the central segment of the tread base.

It was found, surprisingly, that tire handling is determined essentially by the central segment of the tread base, which is then configured so that the rubber compound of this segment has a high elastic modulus and accordingly a high hardness/stiffness. This supports the cornering stiffness, which is adopted as a measure for tire handling. At the same time, the lateral segments of the tread base can be optimized for low rolling resistance by using a rubber compound in these segments that has a low elastic modulus and low hysteresis. FEM calculations have shown that with the configuration of the tread base according to the invention, the conflict of objectives between rolling resistance and handling can be resolved at a higher level.

According to the invention, the tread base can be designed differently, the only important point is that, viewed in the axial direction, it has, at least directed radially outward, a central segment and two lateral segments. The compounds for the central segment and the lateral segments can in each case extend over the whole thickness of the tread base, and the compounds for the two lateral segments can even be based on different compounds, intended for the inside and the outside of the tire. The compound of the central segment can, however, also extend underneath the lateral segments up to the edge of the tread base. It is also possible for the compound for the lateral segments to extend along and underneath the middle segment. It is also possible for the individual segments to extend partially underneath the other respective segments.

It is also possible for the tread base to have, between the central segment and the lateral segments, further zones with yet other compounds. For example, it is possible for the tread base to be made up of a central segment, then intermediate segments and then outer lateral segments. The intermediate segments can be designed so that the transition of the compound between the central segment and the lateral segments is "softer", which may offer advantages with respect to tire durability.

In order to achieve the greatest effect with respect to rolling resistance and handling, the aim according to the invention was to have the central segment of the tread base as stiff as possible and the lateral segments as soft as possible with low hysteresis. However, both very high stiffness values and very low hysteresis values lead to poor resistance to cracking of the compounds. Excessively large jumps in stiffness within the tread base can also lead to problems with tire durability. These aspects form the basis for the following preferred variants of the invention.

According to an advantageous variant of the invention, the dynamic elastic modulus E' at 55° C. according to DIN 53513 (measured at 8% extension) of the rubber compound of the two lateral segments is 35 to 80%, preferably 40 to 75%, especially preferably 50 to 70%, of the dynamic elastic modulus E' at 55° C. according to DIN 53513 (measured at 8% extension) of the rubber compound of the central segment of the tread base. In this way, particularly good results can be achieved with respect to handling, and at the same time the outer segments with low stiffness have a sufficient resistance to cracking in the heavily loaded, axially outer zones (tire shoulders) of the tire tread.

Ranges according to the invention for the dynamic elastic modulus E' at 55° C. according to DIN 53513 (measured at 8% extension) for the rubber compound of the two lateral segments can be for example 2.3 to 6.3 N/mm$^2$, preferably 2.9 to 5.7 N/mm$^2$, especially preferably 3.4 to 5.1 N/mm$^2$.

The rubber compound of the central segment preferably has a dynamic elastic modulus E' at 55° C. according to DIN 53513 (measured at 8% extension) of 5.1 to 9.1 N/mm$^2$, preferably 6.3 to 8.6 N/mm$^2$, especially preferably 6.3 to 7.5 N/mm$^2$.

In order to obtain tires with an especially low rolling resistance, it has proved advantageous if the loss factor tan δ at 55° C. according to DIN 53 513 (maximum value between 0 and 12% extension) of the rubber compound of the two lateral segments is 10 to 70%, preferably 15 to 60%, especially preferably 20 to 50%, of the loss factor tan δ at 55° C. according to DIN 53 513 (maximum value between 0 and 12% extension) of the rubber compound of the central segment of the tread base.

The values of the loss factor tan δ at 55° C. according to DIN 53 513 (maximum value between 0 and 12% extension) of the rubber compound of the two lateral segments can be between 0.02 and 0.12, preferably between 0.025 and 0.12, especially preferably between 0.035 and 0.09. In this way, tires with especially low rolling resistance are obtained.

For the rubber compound of the central segment, values of 0.1 to 0.3, preferably 0.13 to 0.25, especially preferably 0.14 to 0.2, have proved advantageous for particularly good handling.

According to an advantageous variant of the invention, the width of the central segment of the tread base is 20 to 80%, preferably 40 to 70%, of the total width of the tread base. With these widths, the best effects are achieved with respect to good handling at low rolling resistance.

In order to achieve an optimum with respect to the thickness of the tread base, corresponding to the amount of compound used, and the improvement in rolling resistance, with handling at least unchanged, it has proved advantageous if the tread base has a thickness of 0.5 to 5 mm, preferably 0.7 to 3 mm, especially preferably 0.8 to 2 mm. With large thickness of the tread base, a maximum effect can be achieved with respect to handling at low rolling resistance, however, with increasing thickness of the tread base there is a risk of the compounds of the tread base coming in contact with the road at the end of the tire's life, which can lead to poor wet and dry braking behavior and increased abrasive wear.

The hysteresis and the elastic modulus of the rubber compounds for the different segments of the tread base can be affected differently. For example, with special types of rubber, special crosslinking systems, the content of filler, for example the content of carbon black, and/or the binding of the filler to the surrounding rubber matrix, it is possible to exert an influence on the hysteresis and the elastic modulus.

According to a preferred embodiment of the invention, the rubber compound of the two lateral segments has a filler content of less than 50 phr and the rubber compound of the central segment has a filler content of more than 55 phr. With less than 50 phr filler content, low hysteresis is obtained, while more than 55 phr filler content leads to high stiffness. The fillers used can be, for example, carbon black and/or silica, which are also usual for tread cap compounds.

The term phr (parts per hundred parts of rubber by weight) used in this document is usually employed in the rubber industry for stating amounts for compound recipes. The dosage of the parts by weight of the individual substances is always referred to 100 parts by weight of the total weight of all the rubber present in the compound.

The rubber compounds for the segments of the tread base are as a rule based on diene rubbers. The diene rubbers include all rubbers with an unsaturated carbon chain, which are derived at least partially from conjugated dienes. Natural rubber (NR), synthetic polyisoprene (IR), polybutadiene (BR), styrene-butadiene copolymer (SBR) are often used. These diene elastomers can be processed well and give good tire properties in the vulcanized tires.

For influencing the hysteresis both of the rubber compound of the lateral segments and of the rubber compound of the central segment, it has proved advantageous to use polymers with a glass transition temperature of less than −55° C. These polymers include for example natural rubber (NR) or polybutadiene (BR), which can also be used blended.

Apart from rubber and fillers, the rubber compounds can contain other typical additives in usual parts by weight. These additives include plasticizers, silane coupling agents, antiaging agents, for example N-phenyl-N'-(1,3-dimethyl-butyl)-p-phenylenediamine (6PPD), N-isopropyl-N'-phenyl-p-phenylenediamine (IPPD), 2,2,4-trimethyl-1,2-dihydroquinoline (TMQ) and other substances, as are known for example from J. Schnetger, Lexikon der Kautschuktechnik [Dictionary of Rubber Technology], 2nd edition, Hüthig Buch Verlag, Heidelberg, 1991, p. 42-48, activators, for example zinc oxide and fatty acids (for example, stearic acid), waxes, resins and mastication aids, for example 2,2'-dibenzamidodiphenyldisulfide (DBD).

The compounds are crosslinked with sulfur and/or sulfur donors in the presence of vulcanization accelerators.

The production of the pneumatic vehicle tires according to the invention takes place by usual methods known to a person skilled in the art, in which the tread with the configuration according to the invention is produced with corresponding extruders and extruder nozzles and is applied on the tire blank. It is also possible to use a method in which a narrow strip of compound for producing the tread is wound onto the blank. Winding is then alternated between the different compounds for the lateral segments and the central segment.

The pneumatic vehicle tires according to the invention can be both automobile tires and commercial vehicle tires.

The invention will now be explained in more detail with the aid of the drawing and Tables 1 to 3.

BRIEF DESCRIPTION OF THE DRAWING

The invention will now be described with reference to the single FIGURE of the drawing (FIG. 1) which shows schematically a cross section through the tread region of a pneumatic vehicle tire according to the invention.

DESCRIPTION OF THE PREFERRED EMBODIMENTS OF THE INVENTION

FIG. 1 shows, from the usual components of a pneumatic tire for automobiles, a tread 1, a belt 2 preferably with two bracing plies comprising reinforcing components, preferably made of steel cords, embedded in rubber, a radial ply carcass 3, also strengthened with reinforcing components, and an air-tight inner layer 4. The belt 2 is covered with a so-called belt bandage 7 of rubberized textile reinforcing components. Only the axially outer end segments are shown of the side walls of the tire. The chafer zones with bead wires and bead wire profiles are not shown. The tread 1 includes a radially outer rubber layer, the tread cap 5 and a radially inner rubber layer, the tread base 6. A backing, not shown, can also be provided underneath the tread base 6. The tread base 6 has a substantially constant thickness of approximately 2 mm and is divided into three segments in the axial direction, so that it comprises a central segment 6a and two lateral segments 6b. The central segment 6a extends, centrally to the center of the tire, over approximately 50% of the total width of the tread base 6. In the embodiment shown, the two lateral segments 6b are of equal width and are arranged symmetrically to the center of the tire. Between the base of the circumferential grooves and the tread base 6 there is another thin layer of the rubber compound of the tread cap 5, which is caused by the molding and vulcanizing operation, in which the tire blank is pressed into the mold. In FIG. 1, the transition between the lateral segments 6b and the central segment 6a is shown schematically as a vertical line. However, "softer" transitions between the segments, with diagonal transitions, are also possible. In this case the lateral segments 6b preferably overlap the central segment 6a radially outward.

The two lateral segments 6b are made from a rubber compound with a lower dynamic elastic modulus E' at 55° C. according to DIN 53513 (measured at 8% extension) than the rubber compound of the central segment 6a. The compound of the lateral segments 6b also has a lower hysteresis than that of the central segment 6a.

Table 1 shows FEM calculations for the arrangement of compounds with different elastic modulus and different hysteresis in the different zones of the tread base with the resultant percentages for the rolling resistance and the cornering stiffness, wherein the values for the rolling resistance and the cornering stiffness with a tread base consisting of a uniform compound were set equal to 100%. Values above 100% signify an improvement of the corresponding property. The FEM calculations were based on the elastic moduli E, for determination of which the stress-strain curves are adapted so that viscous effects are excluded. Purely elastic stress-strain curves are used.

TABLE 1

| Compound of the central segment 6a | Compound of the lateral segments 6b | Rolling resistance [%] | Cornering stiffness [%] |
|---|---|---|---|
| A | A | 100 | 100 |
| B | B | 102.4 | 99.7 |
| B | C | 104.8 | 99.4 |
| B | D | 105.9 | 99.1 |
| C | C | 104.8 | 97.3 |

With
Compound A: elastic modulus (without viscous effects) E=6.29 N/mm$^2$ (E'=7.2 N/mm$^2$, tan δ=0.22)
Compound B: elastic modulus (without viscous effects) E=5.98 N/mm$^2$ (E'=6.9 N/mm$^2$, tan δ=0.15)
Compound C: elastic modulus (without viscous effects) E=4.09 N/mm$^2$ (E'=4.5 N/mm$^2$, tan δ=0.07)
Compound D: elastic modulus (without viscous effects) E=3.15 N/mm$^2$ (E'=3.6 N/mm$^2$, tan δ=0.044)

It can be seen from Table 1 that the best results with respect to reduced rolling resistance, and cornering stiffness as constant as possible, can be achieved if compounds with high elastic modulus are used for the central segment 6a and compounds with a lower elastic modulus are used in the lateral segments 6b. This is shown by the combinations of compound B in the central segment 6a with the compounds C or D in the lateral segments 6b.

Moreover, tires of size 205/55R16 were built, wherein the compounds for the central segment 6a (compound 1) and the lateral segments 6b (compound 2) of the tread base have the compositions and material properties given in Table 2. The central segment 6a of the tires extended over 50% of the total width of the tread base.

Tires of the same size were also made, for which the tread base was formed completely on the one hand of compound 1 and on the other hand completely of compound 2. The results of the tire tests carried out with these tires are shown in Table 3, wherein the values for the cornering stiffness and the rolling resistance of the tire with compound 1 as tread base were set equal to 100%. Values above 100% signify an improvement of the corresponding property.

The compounds were prepared in the usual conditions, making a base compound and then the finished compound in a laboratory tangential mixer. The Mooney viscosities ML (1+4) at 100° C. were determined using a rotorless curemeter (MDR=moving disk rheometer) according to DIN 53 523. From all the compounds, test specimens were prepared by optimal vulcanization under pressure at 160° C. and material properties that are typical for the rubber industry were determined on these test specimens by the following test methods.

Shore-A hardness at room temperature and 70° C. according to DIN 53 505

Rebound elasticity at room temperature and 70° C. according to DIN 53 512

Tensile strength at room temperature according to DIN 53 504

Extension at break at room temperature according to DIN 53 504

Stress value (modulus) at 300% extension at room temperature according to DIN 53 504

Dynamic elastic modulus E' at 55° C. according to DIN 53 513 at 8% extension

Loss factor tan δ at 55° C. from dynamic-mechanical measurement according to DIN 53 513 as maximum value between 0 and 12% extension

TABLE 2

| | Unit | Compound 1 for central segment 6a | Compound 2 for lateral segments 6b |
|---|---|---|---|
| Ingredients | | | |
| Natural rubber | phr | 70 | 100 |
| BR[a] | phr | 30 | — |
| Carbon black N339 | phr | 75 | 25 |
| Silica | phr | — | 5 |
| Plasticizer oil | phr | 15 | 4 |
| Antiaging agent | phr | 4 | 4 |
| Antiozonant wax | phr | 1 | 1 |
| Adhesive resin | phr | 4 | 2 |
| Stearic acid | phr | 2 | 2 |
| Zinc oxide | phr | 3 | 3 |
| Accelerator | phr | 2.5 | 2 |
| Sulfur | phr | 2.5 | 2 |
| Properties | | | |
| Hardness at RT | ShoreA | 73 | 55 |
| Hardness at 70° C. | ShoreA | 67 | 49 |
| Rebound elast. at RT | % | 37 | 61 |
| Rebound elast. at 70° C. | % | 50 | 73 |
| Tensile strength at RT | MPa | 16 | 16 |
| Extension at break at RT | % | 330 | 450 |
| Stress value 300% | MPa | 15 | 9 |
| E' | N/mm$^2$ | 7.2 | 4.0 |
| tan δ | — | 0.22 | 0.04 |

[a]High-cis polybutadiene

TABLE 3

|  | Tires with compound 1 as tread base | Tires with compound 2 as tread base | Tires with compound 1 in the central segment and compound 2 in the lateral segments |
|---|---|---|---|
| Cornering stiffness | 100 | 94 | 99 |
| Rolling resistance | 100 | 106 | 106 |

The tires according to the invention are characterized by improved rolling resistance, without notable impairment of handling.

It is understood that the foregoing description is that of the preferred embodiments of the invention and that various changes and modifications may be made thereto without departing from the spirit and scope of the invention as defined in the appended claims.

What is claimed is:

1. A pneumatic vehicle tire comprising:
   a radial ply carcass;
   an at least single-layer belt and a tread, which is comprised in the radial direction of two layers made from different rubber compounds; and,
   a tread cap and a tread base;
   wherein the tread base viewed in the axial direction has at least directed radially outwardly, a central segment and two lateral segments;
   wherein the two lateral segments are made from a rubber compound that has a lower dynamic elastic modulus E' at 55° C. according to DIN 53513 (measured at 8% extension) and a lower hysteresis than the central segment of the tread base; and,
   wherein the rubber compound of the two lateral segments has a filler content of less than 50 phr and the rubber compound of the central segment has a filler content of more than 55 phr.

2. The pneumatic vehicle tire as claimed in claim 1, wherein the dynamic elastic modulus E' at 55° C. according to DIN 53513 (measured at 8% extension) of the rubber compound of the two lateral segments is 35 to 80% of the dynamic elastic modulus E' at 55° C. according to DIN 53513 (measured at 8% extension) of the rubber compound of the central segment of the tread base.

3. The pneumatic vehicle tire as claimed in claim 1, wherein the dynamic elastic modulus E' at 55° C. according to DIN 53513 (measured at 8% extension) of the rubber compound of the two lateral segments has a value of from 2.3 to 6.3 N/mm².

4. The pneumatic vehicle tire as claimed in claim 1, wherein the dynamic elastic modulus E' at 55° C. according to DIN 53513 (measured at 8% extension) of the rubber compound of the central segment has a value of from 5.1 to 9.1 N/mm².

5. The pneumatic vehicle tire as claimed in claim 1, wherein the loss factor tan (5) at 55° C. according to DIN 53 513 (maximum value between 0 and 12% extension) of the rubber compound of the two lateral segments is 10 to 70% of the loss factor tan (5) at 55° C. according to DIN 53 513 (maximum value between 0 and 12% extension) of the rubber compound of the central segment of the tread base.

6. The pneumatic vehicle tire as claimed in claim 1, wherein the loss factor tan (5) at 55° C. according to DIN 53 513 (maximum value between 0 and 12% extension) of the rubber compound of the two lateral segments has a value of from 0.02 to 0.12.

7. The pneumatic vehicle tire as claimed in claim 1, wherein the loss factor tan (6) at 55° C. according to DIN 53 513 (maximum value between 0 and 12% extension) of the rubber compound of the central segment has a value of from 0.1 to 0.3.

8. The pneumatic vehicle tire as claimed in claim 1, wherein the width of the central segment of the tread base is 20 to 80% of the total width of the tread base.

9. The pneumatic vehicle tire as claimed in claim 8, wherein the width of the central segment of the tread base is 40 to 70% of the total width of the tread base.

10. The pneumatic vehicle tire as claimed in claim 1, wherein the tread base has a thickness of 0.5 to 5 mm.

11. The pneumatic vehicle tire as claimed in claim 10, wherein the tread base has a thickness of 0.7 to 3 mm.

12. The pneumatic vehicle tire as claimed in claim 1, wherein the rubber compound of the two lateral segments and the rubber compound of the central segment contain polymers with a glass transition temperature ($T_g$) of less than −55° C.

* * * * *